Jan. 27, 1970 J. A. BAUER 3,491,871
COIN-OPERATED CONTROL CIRCUIT
Filed Nov. 18, 1968 5 Sheets-Sheet 1

TEN CENT VEND CONDITIONS

| TOTAL CREDIT | FF1 O1 | FF2 O2 | FF3 AO3 | COINCIDENCE CO1 | COINCIDENCE CO2 | VEND SIGNAL | CHANGE |
|---|---|---|---|---|---|---|---|
| RESET 0 | 0 | 1 | 0 | 0 | 0 | 0 | 0 |
| 5¢ | 1 | 1 | 0 | 0 | 0 | 0 | 0 |
| 10¢ | 0 | 0 | 1 | 0 | 0 | 1 | 0 |
| 15¢ | 1 | 0 | 1 | 1 | 0 | 1 | 5¢ |
| 20¢ | 0 | 1 | 1 | 0 | 1 | 1 | 10¢ |
| 25¢ | 1 | 1 | 1 | 1 | 1 | 1 | 15¢ |

S11 IN POSITION 1, S12 IN POSITION 2

WITNESSES:
Bernard R. Gieguere
James F. Young

INVENTOR
James A. Bauer
BY
Francis T. Blake
ATTORNEY

FIFTEEN CENT VEND CONDITIONS

| TOTAL CREDIT | FF1 O1 | FF2 O2 | FF3 AO3 | COINCIDENCE CO1 | COINCIDENCE CO2 | VEND SIGNAL | CHANGE |
|---|---|---|---|---|---|---|---|
| RESET | 1 | 0 | 0 | 0 | 0 | 0 | 0 |
| 5¢ | 0 | 1 | 0 | 0 | 0 | 0 | 0 |
| 10¢ | 1 | 1 | 0 | 0 | 0 | 0 | 0 |
| 15¢ | 0 | 0 | 1 | 0 | 0 | 1 | 0 |
| 20¢ | 1 | 0 | 1 | 1 | 0 | 1 | 5¢ |
| 25¢ | 0 | 1 | 1 | 0 | 1 | 1 | 10¢ |
| 30¢ | 1 | 1 | 1 | 1 | 1 | 1 | 15¢ |

S11 IN POSITION 2, S12 IN POSITION 1

FIG. 3.

TWENTY CENT VEND CONDITIONS

| TOTAL CREDIT | FF1 O1 | FF2 O2 | FF3 AO3 | COINCIDENCE CO1 | COINCIDENCE CO2 | VEND SIGNAL | CHANGE |
|---|---|---|---|---|---|---|---|
| 0 | 0 | 0 | 0 | 0 | 0 | 0 | 0 |
| 5¢ | 1 | 0 | 0 | 0 | 0 | 0 | 0 |
| 10¢ | 0 | 1 | 0 | 0 | 0 | 0 | 0 |
| 15¢ | 1 | 1 | 0 | 0 | 0 | 0 | 0 |
| 20¢ | 0 | 0 | 1 | 0 | 0 | 1 | 0 |
| 25¢ | 1 | 0 | 1 | 1 | 0 | 1 | 5¢ |
| 30¢ | 0 | 1 | 1 | 0 | 1 | 1 | 10¢ |
| 35¢ | 1 | 1 | 1 | 1 | 1 | 1 | 15¢ |

S11 IN POSITION 1, S12 IN POSITION 1

FIG. 4.

| VEND PRICE | SWITCH POSITIONS S11 | S12 | S13 |
|---|---|---|---|
| 5¢ | 2 | 2 | 2 |
| 10¢ | 1 | 2 | 2 |
| 15¢ | 2 | 1 | 2 |
| 20¢ | 1 | 1 | 2 |
| 25¢ | 2 | 2 | 1 |
| 30¢ | 1 | 2 | 1 |
| 35¢ | 2 | 1 | 1 |
| 40¢ | 1 | 1 | 1 |

FIG. 7.

THIRTY FIVE CENT VEND CONDITIONS

| TOTAL CREDIT | FF1 O1 | FF2 O2 | FF3 O3 | FF4 AO4 | COINCIDENCE CO1 | COINCIDENCE CO2 | COINCIDENCE CO3 | VEND SIGNAL | CHANGE |
|---|---|---|---|---|---|---|---|---|---|
| RESET | 1 | 0 | 0 | 0 | 0 | 0 | 0 | 0 | 0 |
| 5¢ | 0 | 1 | 0 | 0 | 0 | 0 | 0 | 0 | 0 |
| 10¢ | 1 | 1 | 0 | 0 | 0 | 0 | 0 | 0 | 0 |
| 15¢ | 0 | 0 | 1 | 0 | 0 | 0 | 0 | 0 | 0 |
| 20¢ | 1 | 0 | 1 | 0 | 0 | 0 | 0 | 0 | 0 |
| 25¢ | 0 | 1 | 1 | 0 | 0 | 0 | 0 | 0 | 0 |
| 30¢ | 1 | 1 | 1 | 0 | 0 | 0 | 0 | 0 | 0 |
| 35¢ | 0 | 0 | 0 | 1 | 0 | 0 | 0 | 0 | 0 |
| 40¢ | 1 | 0 | 0 | 1 | 1 | 0 | 0 | 1 | 5¢ |
| 45¢ | 0 | 1 | 0 | 1 | 0 | 1 | 0 | 1 | 10¢ |
| 50¢ | 1 | 1 | 0 | 1 | 1 | 1 | 0 | 1 | 15¢ |

S11 IN POSITION 2, S12 POSITION 1, S13 POSITION 1

COIN-OPERATED CONTROL CIRCUIT

Filed Nov. 18, 1968 5 Sheets-Sheet 4

Jan. 27, 1970 J. A. BAUER 3,491,871

COIN-OPERATED CONTROL CIRCUIT

Filed Nov. 18, 1968 5 Sheets-Sheet 5

United States Patent Office 3,491,871

Patented Jan. 27, 1970

3,491,871

COIN-OPERATED CONTROL CIRCUIT

James A. Bauer, Monroeville, Pa., assignor to Westinghouse Electric Corporation, Pittsburgh, Pa., a corporation of Pennsylvania Filed Nov. 18, 1968, Ser. No. 776,564
Int. Cl. G07f *11/00*
U.S. Cl. 194—10 5 Claims

ABSTRACT OF THE DISCLOSURE

This invention relates to a coin-operated control circuit using binary logic register stages and adapted to register and collect nickels, dimes and quarters and to initiate a coin-controlled signal upon registration of coil equal to or greater than any predetermined selected price of a nickel or multiple of a nickel and to return change equivalent to the excess amount of coin registered over the selected price.

CROSS REFERENCES TO RELATED APPLICATIONS

A coin-changer mechanism not using binary logic stages yet adapted to receive nickels, dimes and quarters and to initiate a coin-controlled signal upon receipt of coinage equal to or exceeding the price of a dime and to return change is disclosed in my copending patent application Ser. No. 686,521, filed Nov. 29, 1967, and assigned to the same assignee as the present application.

BACKGROUND OF THE INVENTION

The use of coin-controlled mechanisms for vending, issuing tickets, controlling admission by turnstile and the like is increasing at a rapid rate. The increased usage of such devices for various functions which may have different prices ranging upwards from a nickel in multiples of a nickel has created a great demand for a multi-price coin-operated control adapted to receive nickels, dimes and quarters and to initiate a coin-controlled signal when coin is received and registered equivalent to any selected predetermined price of a nickel or multiple of a nickel. Additionally, the coin-controlled mechanism should include means to return change in the amount equivalent to the excess of coin collected and registered over the amount of the selected price. Of course, such a coin register mechanism should be as simple and reliable as possible and should be compact so as to be capable of being incorporated in the limited spaces available to such mechanisms in the vending machine or the like, it being understood that many existing machines having the conventional single-price coin mechanism will be modified to include the multiple-price coin-changer mechanism of the present invention. Additionally, such multi-price coin changer should be capable of being readjusted to any predetermined selected price by the simple manipulation of switches within the mechanism so that a relatively unskilled serviceman may easily and readily change the coin-control mechanism to respond to a predetermined desired price.

PRIOR ART

United States Patent 3,307,671, issued to J. R. Shirley, on Mar. 7, 1967, is of interest in disclosing a coin collection register and changer using binary logic stages for the counting and registering of the coin in an arrangement considerably different than the present invention as regards to the manner of indicating to the binary register stages the receipt of the various different denominations of coin and the manner of resetting the binary logic upon initiation of the coin controlled signal so as to predetermine the selected price for a coin controlled signal.

SUMMARY

In accordance with the present invention, at least three serially connected binary logic stages, each having an input and two output terminals are provided with one output terminal of each preceding binary stage connected to the input terminal of each succeeding binary stage. A first signal means including a first conductor over which one signal or pulse is transmitted upon receipt of a nickel and two serially occurring signals or pulses are transmitted upon receipt of a dime is connected to the input terminal of the first serially connected binary logic stage. A second signal means including a second conductor over which one signal or pulse is transmitted upon receipt of a quarter is connected to the input terminal of the third serially connected binary logic stage. The second signal means is also arranged to transmit one signal or pulse over the first signal conductor each time a quarter is registered and before the single signal or pulse is transmitted over the second conductor. Since the pulses connected over the first signal conductor are each equivalent to an increment of a nickel, and the single pulse connected over both the first conductor and then the second signal conductor in timed sequence is equivalent to a quarter or five increments of a nickel, the connection of the first signal means conductor to the input terminal of the first of the serially connected binary stages and the connection of the second signal means conductor to the input terminal of the third serially connected binary stage assures the correct registration and totalization of the value of each collected nickel, dime or quarter by the logic circuits of the invention, no matter in what order such coins are received.

In order to selectively predetermine the price for initiating a coin-controlled signal, this invention provides a novel binary stage controllable resetting means to reset each stage to a predetermined condition after each coin controlled signal and before receipt of the next coin for the next coin-controlled operation. Assuming the coin controlled signal to be obtained from an output terminal of the third binary stage when that stage is in a predetermined condition, that stage will change to the predetermined condition after receipt of a predetermined amount of coins from a nickel to a quarter in increments of a nickel depending upon the predetermined initial reset conditions of each of the first, second and third binary stages. More specifically, each binary stage has two reset terminals corresponding to its two output terminals and the resetting means is adjustably and selectively connected to predetermined ones of the reset terminals of each binary stage through adjustable switch reset means to apply a reset pulse in a manner to reset each binary stage to a predetermined one of its two possible conditions, so that the subsequent receipt of pulses indicative of collected coin will correspondingly advance the serially connected binary stages and cause initiation of the coin-controlled signal whenever coin equal to or exceeding the amount of selected price is received after initial reset of the stages. In order to return change, when coin amounts exceeding the selected price are received, this invention provides for the use of a plurality of coincidence circuits each having two input terminals and a single output terminal. The output terminal of each coincidence circuit is connected to pay out a respective amount of change when energized such as a nickel, a dime, or multiples of such coin. One input terminal of each coincidence circuit is connected to a selected output terimnal of a selected binary stage and the other input terminal is connected to the coin-controlled signal so that the simultaneous energization or actuation of both input terminals of a coincidence circuit would result in a payout of a predetermined amount of change when a coin-controlled signal is initiated upon the registration of a predetermined excess amount of collected coin over the selected price.

Other objects and advantages of the invention will be apparent with reference to the following specification and drawings.

BRIEF DESCRIPTION OF THE DRAWINGS

FIG. 3 is a table similar to FIG. 2 but showing the conditions of operation when the switches S1 and S2 of FIG. 1 are adjusted to cause the initiation of a coin-controlled signal upon receipt and registration of coin amounting to the selected price of fifteen cents;

FIG. 4 is a table similar to FIGS. 2 and 3 but showing the conditions of operation when the circuit of FIG. 1 and its switches S1 and S2 are adjusted to provide the initiation of a coin controlled signal upon the selected price of twenty cents;

FIG. 7 is a table to show the various different switch positions for switches S1, S2 and S3 in the system of FIG. 5 for vending or initiating a coin-controlled signal at selected prices of five cents to forty cents in increments of a nickel;

DESCRIPTION OF THE PREFERRED EMBODIMENTS

Figures 1, 2:
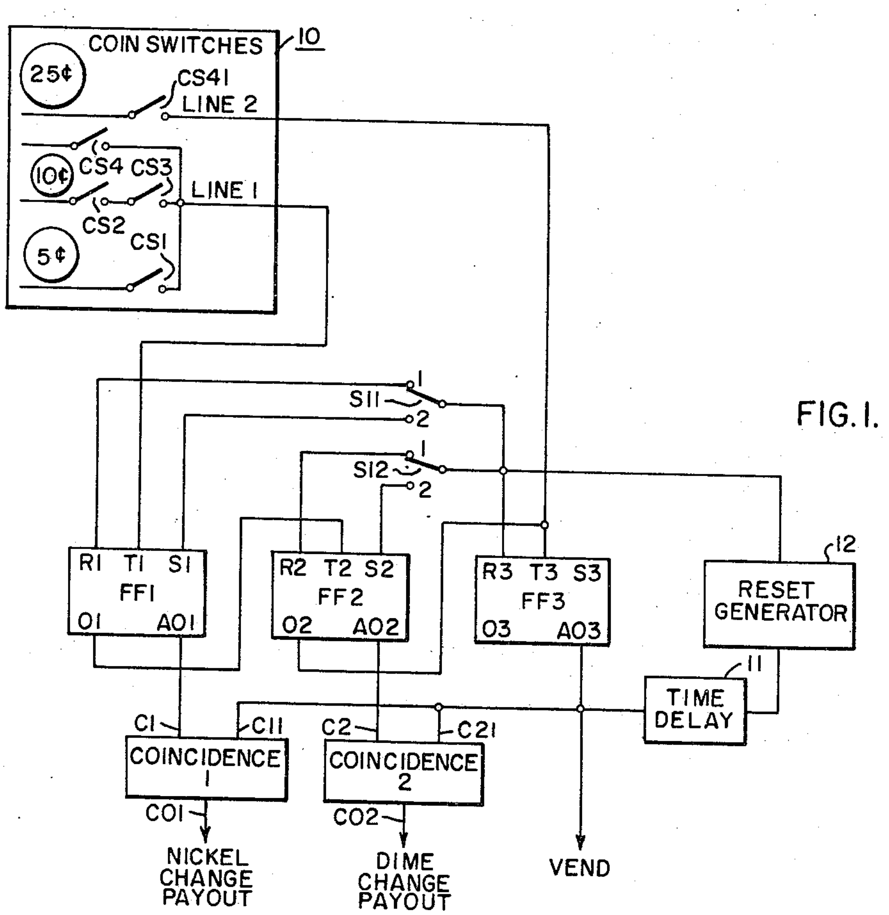
FIGURE 1 is a logic block diagram of a simple form of the invention by which a coin controlled signal is obtained upon the registration of coins in any selected amount from a nickel to twenty cents in increments of a nickel and change is returned after registration of an amount of coin exceeding the selected price.
FIG. 2 is a table illustrating the conditions of operation for the invention shown by block diagram of FIG. 1 with switches S1 and S2 adjusted for initiating a coin-controlled signal or vend upon the receipt and registration of ten cents.

Referring first to the logic block diagram of FIG. 1, three serially connected binary logic stages FF1, FF2 and FF3 are shown each having a respective input terminal T1, T2 and T3. Each binary logic stage such as stage FF1, FF2 or FF3 is provided with a pair of respective output terminals 01, A01, 02, A02, and 03, A03. In addition each binary logic stage FF1, FF2, FF3 is provided with respective reset terminals corresponding to their output terminals as shown at R1, S1, R2, S2, and R3, S3. It should be understood that each of the binary logic stages FF1, FF2, FF3 may be comprised of conventional electronic flip-flop circuits using either tubes or transistors or may be comprised of conventional mechanical flip-flop circuits using fluid logic or straight mechanical linkage as is well known in the art. Therefore, the details of the binary logic stages FF1, FF2 and FF3 are not described at this time since such details may assume various forms known to those skilled in the art.

Coin switches are generally shown at 10 and it should be understood that these coin switches may be of any well known form and may include either microswitches activated by the passage of coin within a particular coin channel or may be photocells that are switched by the interruption of light when a coin passes through the particular coin channel. It should also be understood that the coins such as nickels, dimes and quarters are initially sorted and routed to the various coin switches to be described through predetermined coin channels by means of a conventional coin detector and slug rejector for rejecting spurious coins as is well known in the art.

As shown by FIG. 1 of the drawing, a five-cent coin will be routed to momentarily close coin switch CS1 and supply a signal or pulse over line 1 to the input terminal T1 of the first of the serially connected binary stages FF1. Similarly, a dime coin would be routed to pass over and momentarily close coin switches CS2 and CS3 to serially connect two signals or pulses over line 1 to the input terminal T1 of the first binary stage FF1. On the other hand a quarter coin will be routed to pass over and momentarily close coin switch CS4 for applying a pulse or signal to line 1 and the input terminal T1 of binary stage FF1 and thereafter to momentarily pass over and close coin switch CS41 to apply a signal or pulse over line 2 to the input terminal T3 of the third of the serially connected binary stages FF3. Means (not shown) is provided to return any coin sought to be deposited after a coin controlled signal is initiated and before the vending operation or other function is completed as is well known in the art. Also means may be provided, as is well known in the art, to return any coin sought to be deposited when the vending operation is incapable of being completed properly.

A coin-controlled signal is obtained at a selected output of any of the binary stages FF1, FF2 or FF3 when that stage is in a predetermined condition and as shown by FIG. 1 of the drawing the coin controlled or vend signal may be obtained from the output terminal A03 of the third binary stage FF3. The coin controlled signal as initiated at the output terminal A03 is also connected through a conventional time delay element 11 to activate the reset generator 12 to produce a pulse to be connected through reset switches S11 and S12 to selected ones of the reset terminals or the binary register stages FF1, FF2, FF3. Depending upon the adjusted positions of the reset switches S11 and S12, each of the binary stages FF1, FF2 and FF3 will be reset to particular conditions such that the subsequent applications of signal or pulses from the coin switches 10 will cause the third binary stage register FF3 to initiate the coin-controlled signal through its output terminal A03 at a predetermined selected price of a nickel to twenty cents depending upon the preset positions of the switches S11 and S12 and the preset reset conditions of the binary stages FF1, FF2 and FF3 before coin is collected and registered.

In order to return change when an excess amount of coin is registered and collected over the predetermined selected coin controlled price, a pair of coincidence circuits shown as coincidence 1 and coincidence 2 are provided. Each coincidence circuit is provided with a respective output terminal C01 and C02 and a pair of respective input terminals C1 and C11 and C2 and C21. The output terminal C01 of coincidence 1 circuit may be connected to operate a nickel coin payout tube when energized to return a nickel and the output terminal C02 of coincidence circuit 2 may be connected to operate a dime payout coin tube when energized to return a dime. An example of such coin tube mechanisms is shown in my copending patent application S.N. 686,521, previously mentioned. A simple change in thickness of the coin pushing slide of the coin tube, as is well known in the art, may enable the return of more than one dime or nickel as desired when the respective output terminal of the coincidence circuits are energized. As shown by the block diagram of FIG. 1, input terminal C1 of coincidence circuit 1 is connected to the output terminal A01 of the first binary stage FF1 and the other input terminal C11 is connected to the coin controlled signal occurring at the output terminal A03 of the third binary stage FF3. Similarly, the input terminal C2 of coincidence circuit 2 is connected to the output terminal A02 of the second binary stage FF2 and its other input terminal C21 is connected to the coin controlled signal occuring at the output terminal A03 of the third binary stage FF3. The coincidence circuits 1 and 2 may take any well known form by which simultaneous occurrence of predetermined conditions on each of the input terminals of a respective coincidence circuit is requiréd before an output signal will appear at its respective output terminal to energize the coin payout tube associated therewith.

In order to better understand the various operations of the coin-controlled circuit shown by the logic diagram of FIG. 1, reference may be made to the tables shown by FIGS. 2, 3 and 4 of the drawings. Considering first the table shown by FIG. 2 of the drawings, the conditions of operation with the switch S11 in the position 1 and the switch S12 in the position 2 will be described whereby a coin-controlled signal is initiated at the output terminal A03 of the third binary stage FF3 upon receipt of coin equal to not less than ten cents. Assuming first that a previous coin-controlled operation has been obtained and the reset generator 12 has been energized to apply a single pulse through switches S11 and S12 adjusted to their respective first and second positions, the respective binary stages FF1, FF2 and FF3 will be reset to the conditions shown by the table with an output condition indicated for only the output terminal 02 of the second binary stage FF2. The deposit of the first five cents will activate the coin switch CS1 to momentarily apply a signal on line 1 to the input terminal T1 of the first binary stage FF1 to provide an output condition at its output terminal 01 without changing the binary stage FF2 which still indicates an output condition at its output terminal 02. Since the third binary stage FF3 remains unchanged with no output signal at its terminal A03, there is no coin-controlled output signal upon the receipt of only five cents. If a second nickel is deposited to reclose momentarily the coin switch CS1 or if a dime had been initially deposited to serially close both coin switches CS2 and CS3, a total of two pulses would have been applied to the input terminal T1 of the first binary stage FF1 causing the output terminal 01 of the first binary stage FF1 to again register no output signal but advancing the binary stage FF2 to register an output signal at its terminal A02 and remove the output signal from terminal 02. The removal of the output signal from terminal 02 as connected to the input terminal T3 of the third binary stage FF3 changes its condition to register an output signal at its output terminal A03 and initiate a coin-controlled signal upon the receipt and totalization of ten cents. As further indicated by reference to the table of FIG. 2 when a total of fifteen cents credit is received each of the indicated output terminals of the binary stages FF1, FF2 and FF3 will assume the conditions indicated where the digit 1 in the table indicates that the output signal is present at the indicated output terminal. It will be noted that the coincidence 1 circuit will also have output signals simultaneously applied to its input terminals C1 and C11 so that the digit 1 in the table indicates an energization of the output terminal C01 and the return of five cents change if fifteen cents had somehow been deposited for a dime price. Of course, such deposit of fifteen cents for a dime price is an illogical move on the part of the consumer and normally would be prevented because the totalization of ten cents would initiate the coin-controlled signal and cause a subsequent deposit of a nickel to be returned to the customer as previously described. However, the circuit will function to return change in the unlikely event that a customer has been able to first deposit a nickel and then a dime to obtain a ten-cent vend. The table further shows that upon the deposit of a total credit of twenty cents which is again an illogical operation on the part of the consumer, nevertheless coincidence circuit C02 would be energized to return a dime change. When the customer deposits a quarter to momentarily close coin switch CS4 and then coin switch CS41 the binary stages FF1, FF2 and FF3 will change to the conditions indicated from the initial reset condition to initiate the coin controlled signal and to produce outputs at both C01 and C02 of coincidence circuits 1 and 2 to return a dime and a nickel change to the customer. It should be understood that the coin controlled signal appearing at the output terminal A03 first energizes the appropriate vend relay or other instrumentality of the coin controlled machine and thereafter, through the time delay circuit 11, energizes the reset generator 12 to again reset each of the binary stages FF1, FF2 and FF3 to the indicated reset conditions of the table of FIG. 2 through switches S11 and S12 as adjusted for the ten cent coin controlled price or vend condition.

Referring to FIG. 3 of the drawing, the various conditions of operation for the circuit of FIG. 1 are indicated with the switch S11 adjusted to position 2 and switch S12 adjusted to position 1 for providing a coin controlled signal or vend at a price of fifteen cents. Again it will be understood that the table shows a number of possible illogical operations by the consumer such as depositing thirty cents for a fifteen-cent vend. Nevertheless, if the coin switches have been illogically operated, the logic circuit of the invention including the three serially connected binary stages FF1, FF2, FF3 and the coincidence change circuits coincidence 1 and coincidence 2 will be effective to return the requisite amount of change at the time the coin controlled signal is initiated.

FIG. 4 shows a table of the conditions of operation for the block diagram of FIG. 1 and is similar to the previously described tables of FIGS. 2 and 3 except that the reset switch S11 is adjusted to position 1 and the reset switch S12 is also adjusted to position 1 thus causing the reset conditions of each of the binary stages FF1, FF2 and FF3 to be such that an output signal will appear at the output terminal A03 of the third binary stage FF3 when a coin registration and collection of twenty cents or more is received. Again the table of FIG. 4 shows a number of illogical operations on the part of the consumer such as the deposit of thirty cents or thirty-five cents for a twenty-cent vend condition but nevertheless if the collection of coin in this illogical order is somehow obtained, the logic circuits ȯf the invention will assure the return of the requsite amount of change in addition to the initiation of the vend signal for a twenty-cent vend price.

Figures 5, 6:
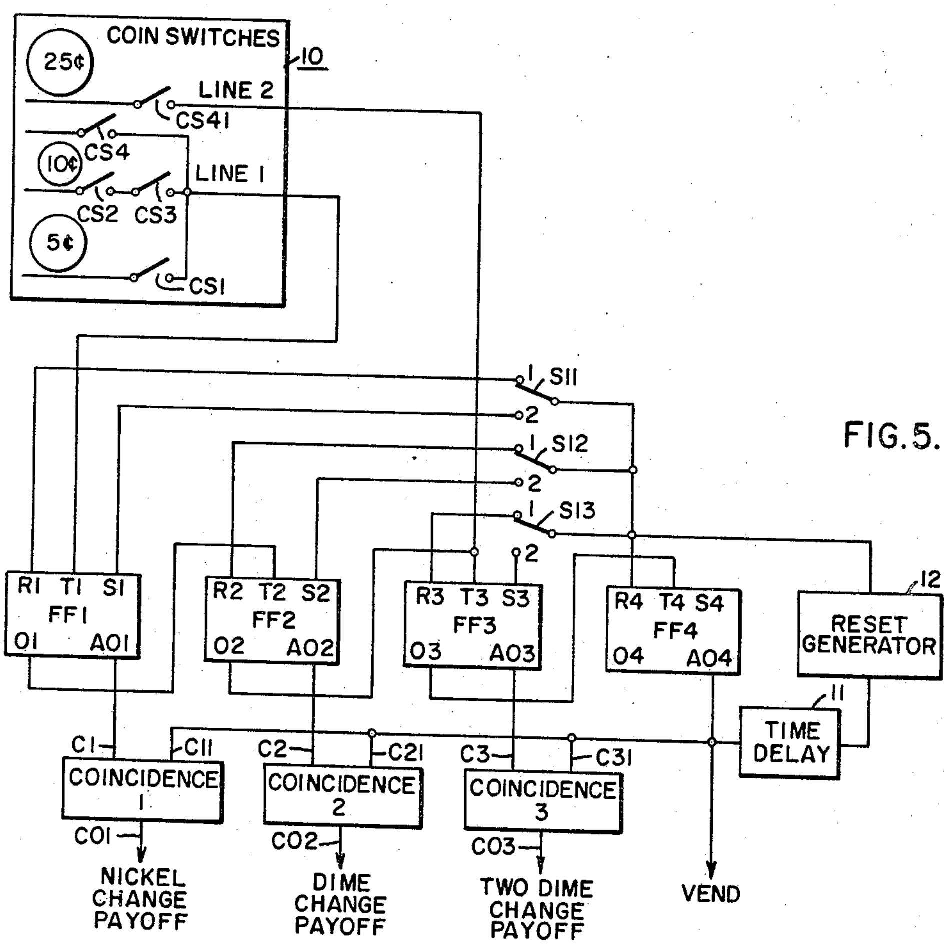
FIG. 5 is a logic block diagram showing a modified form of the invention which is capable of being adjusted to initiate a control signal for any selected price from a nickel to forty cents in increments of a nickel.
FIG. 6 is a table to show the conditions of operation for the system of FIG. 5 with the switches S1, S2 and S3 adjusted to positions causing the initiation of a coin-controlled signal after the receipt and registration of coinage at least equal to thirty-five cents.

Referring now to FIG. 5 of the drawings, a block diagram of a modified form of the invention showing how with the addition of a fourth serially connecte binary stage FF4 and a third reset switch S13, a coin controlled signal or vend operation may be enabled for any predetermined selected price from a nickel to forty cents. As shown, this system also provides for the addition of a third coincidence change circuit indicated at coincidence 3 as having an output terminal C03 which may be connected to a change tube in a manner to return two dimes or four nickels in change whenever the output terminal C03 is energized. The operations of the system of FIG. 5 are generally similar to that of FIG. 1 and may be best understood by an examination of the table of FIG. 6 of the drawings which shows how the circuit would function for a coin controlled price of thirty-five cents with the reset switch S11 adjusted to the position 2, reset switch S12 adjusted to position 1 and reset switch S13 adjusted to position 1. As shown by the table of FIG. 6, the receipt of coinage equal to thirty-five cents will cause the output terminal A04 of binary stage FF4 to be in the output condition and initiate a coin controlled signal and thereafter energize the reset generator 12 to reset each of the binary stages FF1–FF4 to their reset conditions. If more than thirty-five cents in coinage is registered, as shown by the table of FIG. 6, the appropriate coincidence circuits output terminals C01 and C02 or C03 will be energized to return the requisite amount of change coinage.

However, if the positions of the reset switches S11, S12 and S13 for the system of FIG. 5 are adjusted to others of the switch positions as shown by the table of FIG. 7, it is possible to adjust the system to initiate a coin controlled signal for thirty cents. Under such circumstances the coincidence 3 circuit would be operated to energize its output terminal C03 and return two dimes in change if two quarters have been deposited to initiate the coin controlled signal at a price of thirty cents.

Figure 9:
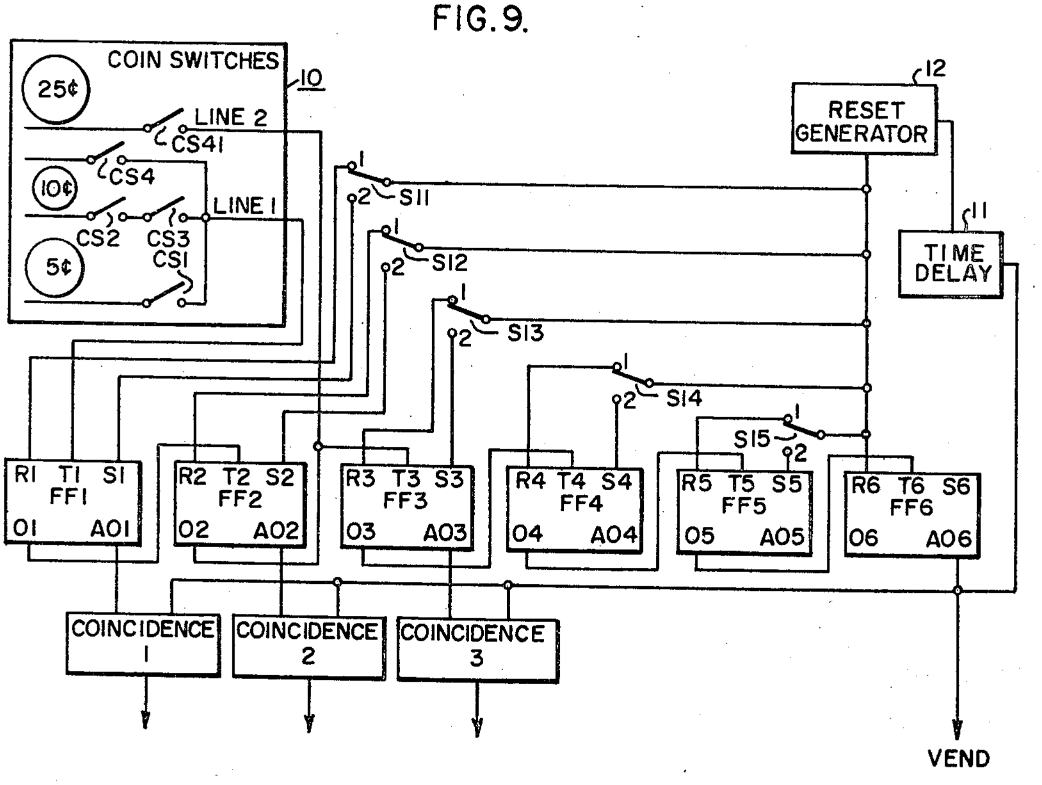
FIG. 9 is a block diagram of yet another modified form of the invention showing how with the addition of successive binary register stages and with additional reset price selection switches, the selected price for initiating a coin controlled signal may be increased in increments of a nickel to a maximum price such as $1.60 for the system shown.

Referring to FIG. 9 of the drawings, the block diagram of yet another system of the invention is shown wherein additional binary stages FF5 and FF6 are added together with the reset switches S14 and S15 so that the system of the invention may be adjusted to operate and initiate a coin controlled signal price of up to $1.60 in increments of a nickel. It will be noted that it is not necessary to add any additional coincidence change circuits other than the circuits coincidence 1, coincidence 2 and coincidence 3 inasmuch as there are only three different denominations of coin namely nickels, dimes and quarters that may be deposited to accrue the predetermined coin-controlled price or an excess thereof. Stated another way, any logical excess of coinage that could be deposited in the system of FIG. 9 cannot exceed a coin refund amount that will be greater than can be returned by the energization of the respective output terminal of the nickel, dime or two dime coincidence change payout circuits. No tables of optional operations for the system of FIG. 9 are shown in the drawing since it is believed that they are unnecessary in that such functions are essentially the same and are extensions of the previous functions described in connection with the system of the invention shown by FIGS. 1 or 5 of the drawings.

Figure 8:
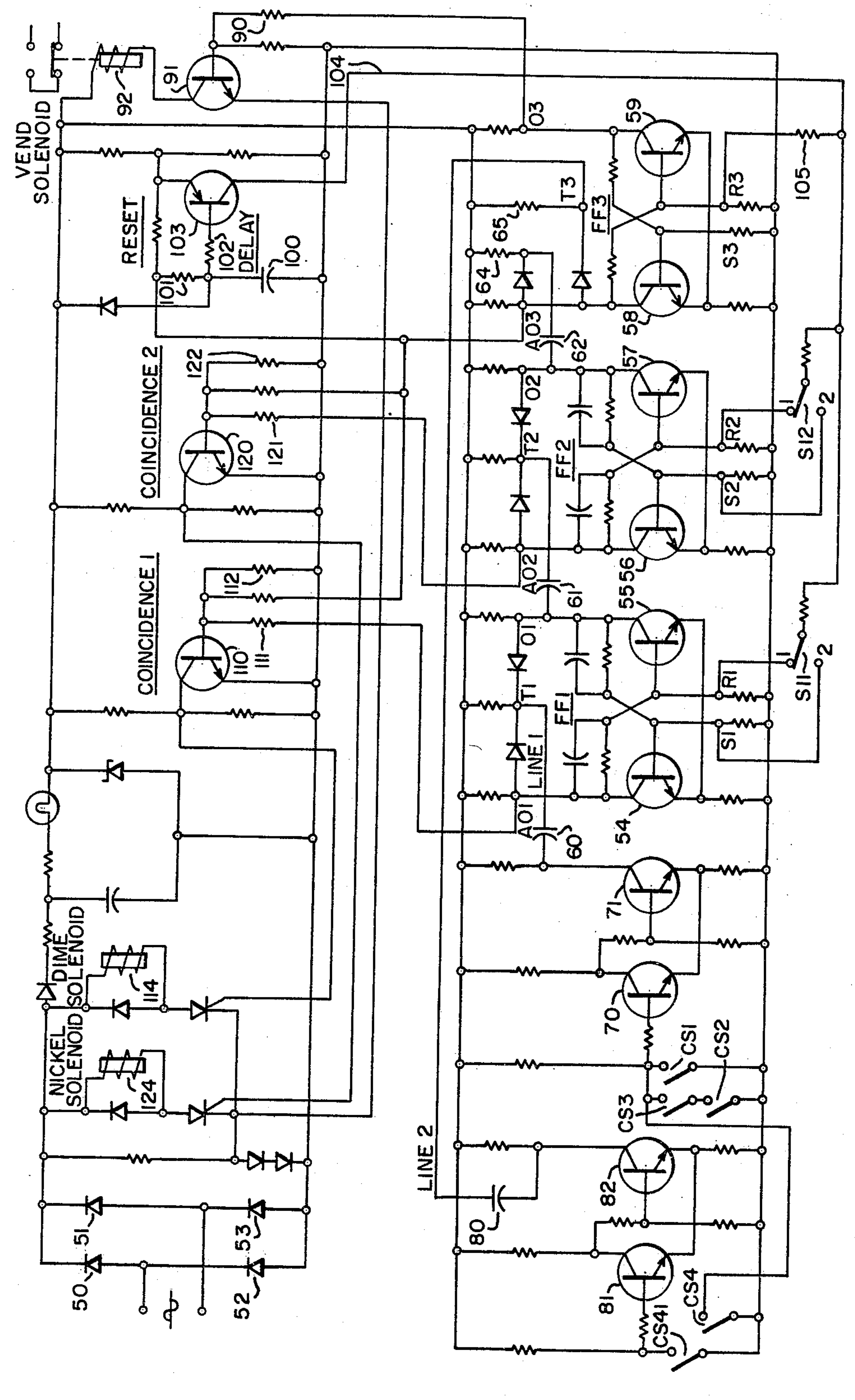
FIG. 8 is a detailed schematic wiring diagram of the coin-controlled system shown by the block diagram of FIG. 1.

FIG. 8 of the drawings is a schematic diagram of a transistorized electronic embodiment of the system of the invention shown by FIG. 1 of the drawings. A power supply is shown using the diode rectifiers 50–53 in a conventional bridge circuit. The first binary stage FF1 is comprised of transistors 54 and 55 connected in a conventional flip-flop circuit. Similarly, the second binary stage FF2 is comprised of transistors 56 and 57 in a binary flip-flop circuit while the third binary stage FF3 is comprised of transistors 58 and 59. A coupling capacitor 60 is connected by line 1 to input terminal T1 of the flip-flop FF1. The output terminal 01 of flip-flop FF1 is connected by a coupling capacitor 61 to the input terminal T2 of the second binary stage FF2 and the output terminal 02 of flip-flop FF2 is connected by a coupling capacitor 63 and resistor 64 and 65 to the input terminal T3 of binary stage FF3. The pulse signal connected to capacitor 60 is provided from the transistor amplifier including transistors 70 and 71 whenever coin switches CS1, CS2 or CS3 are momentarily closed.

The input capacitor 80 is connected by line 2 to the input terminal T3 of the third binary stage FF3. This input pulse is provided by the transistor amplifier including the transistors 81 and 82 which are operated whenever the coin switch CS41 is momentarily closed upon the deposit of a quarter. It will also be noted that coin switch CS4 is operated upon the deposit of a quarter at a time slightly before the coin switch CS41 is operated and coin switch CS4 is connected to the base electrode of transistor 70 in a similar manner to coin switches CS1, CS2 and CS3 so that when a quarter coin is deposited a pulse is first connected through the capacitor 60 to line 1 and then connected through capacitor 80 to line 2.

The output signal of whatever state occurring at the output terminal 03 of flip-flop FF3 for the predetermined condition of that binary stage indicative of the receipt of coin for the selected coin controlled price is connected through resistor 90 to the transistor 91 to thereby energize the coin controlled relay or vend solenoid 92. Also, at the time the appropriate signal appears at the output terminal 03, the other terminal A03 of the third binary stage FF3 will change its condition which through a delay circuit including capacitor 100 and resistors 101 and 102 causes the reset generator transistor 103 to be operative to thereby connect a reset pulse through line 104 and reset switches S11 and S12 to the appropriate reset terminals S1, R1, S2, R2 and R3 of the respective binary stages FF1, FF2, FF3. Thus upon the change of state of the binary stage FF3 to produce a coin controlled signal at its output terminal 03 and a change of signal at its other output terminal A03, the vend solenoid 92 will be first energized and thereafter the reset generator transistor 103 will become effective to connect a reset pulse over the line 104 and reset switches S1 and S2 together with reset resistor 105 to the respective binary stages FF1, FF2, FF3 for resetting them to the predetermined condition in accordance with the predetermined selected coin-controlled price as determined by the preset conditions of switches S11 and S12.

Coincidence change circuit 1 is comprised of the transistor 110 while the coincidence change circuit 2 comprises the transistor 120. The base electrode of transistor 110 is connected through a resistor 111 to the output terminal A01 of the first binary stage FF1 and is also connected through resistor 112 to the output terminal A03 of the third binary stage FF3 whose condition is indicative of the initiation of a coin controlled signal. Thus when the coincident conditions of the output terminals A01 and A03 are as required, the coincidence transistor 110 will be operative to, in the specific arrangement shown, become non-conductive and energize the dime solenoid 114. Similarly, the coincidence change circuit 2 and its transistor 120 is connected with its base electrode through resistor 121 to output terminal A02 of the second binary stage FF2 and through resistor 122 to the output terminal A03 of the third binary stage FF3. Thus when the conditions of output terminals A02 and A03 are simultaneously such as to indicate initiating a coin controlled signal and returning at least a nickel change, the transistor 120 will become nonconductive to energize the nickel solenoid 124.

It should be understood that this invention is not limited to the particular details of any given circuit such as that described in some detail in connection with FIG. 8 of the drawings and that various other electronic circuits providing the functions for the block diagrams shown by FIGS. 1, 5 or 9 of the drawings may be used. Also it should be understood that the well known mechanical fluid logic equivalents of the logic elements shown by FIG. 1 of the drawing may be substituted for the electronic forms of these logic circuits as specifically described without departing from the spirit of the invention. Various other modifications may be made within the scope and spirit of the invention.

I claim:

1. A coin-operated register control adapted to receive nickels, dimes and quarters and to initiate a coin controlled signal for any selected price of a nickel or multiple of a nickel comprising, coin-operated register means having first and second signal means to initiate a single signal by the first signal means whenever a nickel is registered and to initiate two serially occurring signals by the first signal means whenever a dime is registered together with initiating a single signal by said first and then said second signal means whenever a quarter is registered, comprising at least three serially connected signal operated binary stages each having an input and first and second outputs respectively operative to initiate output signals for different respective binary stage states with one output of each preceding stage connected to the input of each succeeding stage to change the state of each succeeding stage for every other change of state of the preceding stage, each binary stage also having first and second reset means for each first and second output respectively, means connecting the first signal from the first signal means of said coin collection means to the input of the first of said binary stages to change its state each time a signal is initiated therefrom, means connecting the signal from the second signal means of said coin collection means to the input of the third of said binary stages to change its state each time a signal is initiated therefrom, means connecting the output signal from a selected predetermined one of the outputs of a selected one of the binary stages as a coin controlled signal whenever that stage is in a predetermined state corresponding to collection of coin equal to the coin control price, binary stages resetting means operative to initiate a reset signal, means connecting the coin-controlled signal to activate said binary stages resetting means as the coin-control signal is initiated, and means connecting the reset signal from said stages resetting means to predetermined ones respectively of the first and second reset means of each binary stage to reset the binary stages to predetermined reset states as determined by the selected price.

2. The invention of claim 1 in which the means connecting the coin-controlled signal to activate said binary stages resetting means includes a delay means to assure that the resetting means will be activated only after a predetermined time after said coin-controlled signal is initiated.

3. The invention of claim 1 in which the means connecting the reset signal from said stages resetting means to the reset means of each binary stage includes switch means to selectively change the predetermined reset states respectively of the binary stages as determined in relation to predetermined different selected prices respectively.

4. The invention of claim 1 in which the means connecting the coin-controlled signal to activate said binary stages resetting means includes a delay means to assure that the resetting means will be activated only after a predetermined time after said coin-controlled signal is initiated, and the means connecting the reset signal from said stages resetting means to the reset means of each binary stage includes switch means to selectively change the predetermined reset states respectively of the binary stages as determined in relation to predetermined different selected prices respectively.

5. The invention as defined in any one of claims 1–4, having means to pay out change comprising, a plurality of payout change coincidence stages each having two inputs and an output, one input of each coincidence state being connected to a predetermined one of the outputs of a respective different one of said binary stages and the other input terminal of each coincidence stage being connected to an output terminal of the binary stage from which the coin-controlled signal is derived, and means connecting the output terminal of each coincidence stage to respective different change payout devices to thereby pay out a respective different amount of change upon the coincidental energization of both inputs of a respective coincidence stage.

References Cited

UNITED STATES PATENTS 3,321,058 5/1967 Brooks -------------- 194—2

SAMUEL F. COLEMAN, Primary Examiner